United States Patent [19]

Antony et al.

[11] Patent Number: 5,064,028
[45] Date of Patent: Nov. 12, 1991

[54] LEAF SPRING FOR HOLDING DOWN THE BRAKE-LINING CARRIER OF A DISC BRAKE

[75] Inventors: Paul Antony, Burstadt; Wilfried Strauss, Wald-Michelbach, both of Fed. Rep. of Germany

[73] Assignee: Deutsche Perrot-Bremse GmbH, Mannheim, Fed. Rep. of Germany

[21] Appl. No.: 497,607

[22] Filed: Mar. 22, 1990

[30] Foreign Application Priority Data

Mar. 29, 1989 [DE] Fed. Rep. of Germany ....... 3910154

[51] Int. Cl.⁵ .............................................. F16D 65/00
[52] U.S. Cl. ............................... 188/73.38; 188/250 E
[58] Field of Search ............... 188/73.38, 73.36, 73.35, 188/73.37, 205 A, 73.1, 73.39, 250 E

[56] References Cited

U.S. PATENT DOCUMENTS

| | | | |
|---|---|---|---|
| 4,049,087 | 9/1977 | Heinz et al. | 188/73.38 |
| 4,417,647 | 11/1983 | Cotter et al. | 188/73.38 |
| 4,445,595 | 5/1984 | Baum | 188/73.38 |
| 4,463,837 | 8/1984 | Coubot | 188/73.38 |
| 4,673,065 | 6/1987 | Gerard et al. | 188/73.38 |
| 4,699,254 | 10/1987 | Mery | 188/73.36 |

FOREIGN PATENT DOCUMENTS

| | | | |
|---|---|---|---|
| 0112255 | 6/1984 | European Pat. Off. | 188/73.37 |
| 0248385A1 | 6/1987 | European Pat. Off. | |
| 2558141 | 7/1976 | Fed. Rep. of Germany | |
| 2558294 | 7/1976 | Fed. Rep. of Germany | |
| 3323362 | 1/1985 | Fed. Rep. of Germany | |
| 3621507 | 1/1988 | Fed. Rep. of Germany | |

*Primary Examiner*—Matthew C. Graham
*Assistant Examiner*—Josie A. Ballato
*Attorney, Agent, or Firm*—Fleit, Jacobson, Cohn, Price, Holman & Stern

[57] ABSTRACT

Leaf spring (18) for holding down the brake-lining carrier (25, 26), of a disc brake wherein the brake-lining carrier (25, 26) has a friction-lining free section (39) onto which is fixed a central holding section (27) of the leaf spring. The leaf spring has two uneven shanks (32, 33) which are each transversely angled from the central neck section (27) towards the brake-lining carrier. The shank (33) faces in a preferred direction of travel (D) towards the entrance side of the brake disc (2) and is bent away (35, 36, 37) from the brake-lining carrier radially outward (37) and abuts with its end (38) against the edge (22, 24) of an opening (17) of the caliper unit, which opening (17) accommodates friction-lining-free-section (39) of the brake-lining carrier (25, 26).

4 Claims, 5 Drawing Sheets

LEAF SPRING FOR HOLDING DOWN THE BRAKE-LINING CARRIER OF A DISC BRAKE

BACKGROUND OF THE INVENTION

The invention relates to a leaf spring for holding down the brake-lining carriers of a disc brake wherein the brake-lining carrier has a friction-lining free section extending radially towards the outside onto which is fixed a holding section of the leaf spring, whereby the leaf spring has two shanks which are transversely angled from the holding section towards the brake-lining carrier and supported on two support surfaces, arranged at the bottom on both sides of an opening of a caliper unit, which opening accommodates the friction-lining free section of the brake-lining carrier.

In a leaf spring of this type, as described in German patent reference DE-OS 25 58 294, both shanks are identical in construction. When mounted, the leaf spring, supported against the caliper unit, exerts a centrally directed force on the brake-lining carrier. This means that the brake linings are only radially pretensioned against the respective guide surfaces which can be arranged either in the brake carrier or in the caliper unit. Disc brakes also have lateral guide surfaces against which the brake linings can support themselves during actuation of the brakes in dependence on the rotational direction of the brake disc. Thus, the occurring brake moment is transferred to and absorbed by a support member of the brake carrier.

In order to guarantee easy running of the brake linings in the guide section, both during the braking and the return after the brake release, a certain play is provided between the lateral surfaces of the brake-lining carrier and the lateral guide surfaces in the support member of the brake carrier, which play also serves to compensate manufacturing tolerances. However, this present play results in the brake-lining carrier, which is only radially pretensioned by the leaf spring, being dragged along during braking from its inoperative position in the direction of rotation of the brake disc due to the adhesive friction developing between the brake lining and the brake disc, and after having overcome the present play, abruptly abutting against the lateral guide surfaces of the brake carrier. This causes a most undesirable knocking sound in the brake, which is particularly disturbing during frequent braking in town traffic, or frequent braking at short intervals. Furthermore, such abrupt loading can cause damage to the brake-lining carrier and the support member of the brake carrier, thus no longer guaranteeing easy running of the brake-lining carrier in the guide section.

A further disadvantage of the known leaf spring, which holds down the brake-lining carrier only in the radial direction, appears with a mounting position of the disc brake wherein the caliper unit is not above the brake disc but, as seen in the direction of travel, behind the vehicle axis. In this mounting position of the disc brake, the brake carriers will always be inclined, due to their own weight as well as vehicle vibrations, to abut against the lower lateral guide surface, so that not only the aforedescribed effect during braking is unavoidable, but additionally the knocking sounds when the brake is released.

Further springs for holding down of brake-lining carriers are described in German patent references DE-OS 2 558 141, DE-OS 3 323 362, DE-OS 3 621 507 and in European patent reference EP 0 248 385 A1.

These already known holding-down springs exert only a pretensional force on the brake-lining carrier towards the center point of the brake disc.

BRIEF SUMMARY OF THE INVENTION

It is an object of the invention to create a leaf spring of the type referred to above and a suitable linkage between the latter and the brake-lining carrier, thus making it possible to force the brake-lining carriers of a disc brake radially and simultaneously in a preferred braking direction in the rotational direction of the brake disc against the guide surface of the supporting member of the brake carrier without effecting the easy running of the brake linings in the respective guide section. The invention thereby ensures that the holding-down spring cannot release itself from the brake-lining carrier, either in its mounting position or during necessary mounting or removal work. Furthermore, the respective parts are economical to produce and insertable on both sides of the brake disc and allow easy exchange of brake linings or the holding-down spring.

This object is achieved by the invention which includes a leaf spring for holding down the brake-lining carriers on opposite sides of a disc of a caliper disc brake, each brake-lining carrier having a friction-lining thereon and a friction-lining free section extending radially outwardly, two support surfaces arranged on radially inner surfaces on both sides of and defining an opening of a caliper unit, the friction-lining free section of the brake lining carrier being accommodated in the opening, a holding section, first and second uneven shanks extending substantially oppositely to each other and transversely at an angle from the holding section towards the brake-lining carrier, the first shank extending in a direction towards the entrance side of the disc brake relative to the direction of travel of the disc and having a portion bent away from the brake-lining carrier radially outwardly and an end portion engaging against a portion of one of the two support surfaces, and the second shank having a portion thereon engaging against at least a portion of the other of the two support surfaces.

BRIEF DESCRIPTION OF THE DRAWINGS

Further details, advantages and features of the invention will now be described with reference to the accompanying drawings, wherein.

DETAILED DESCRIPTION

Although the invention as explained below is based on a sliding-caliper disc brake, it is accepted that the basic idea of the invention can be realized in an equally advantageous way with a fixed-caliper disc brake.

Figure 1:
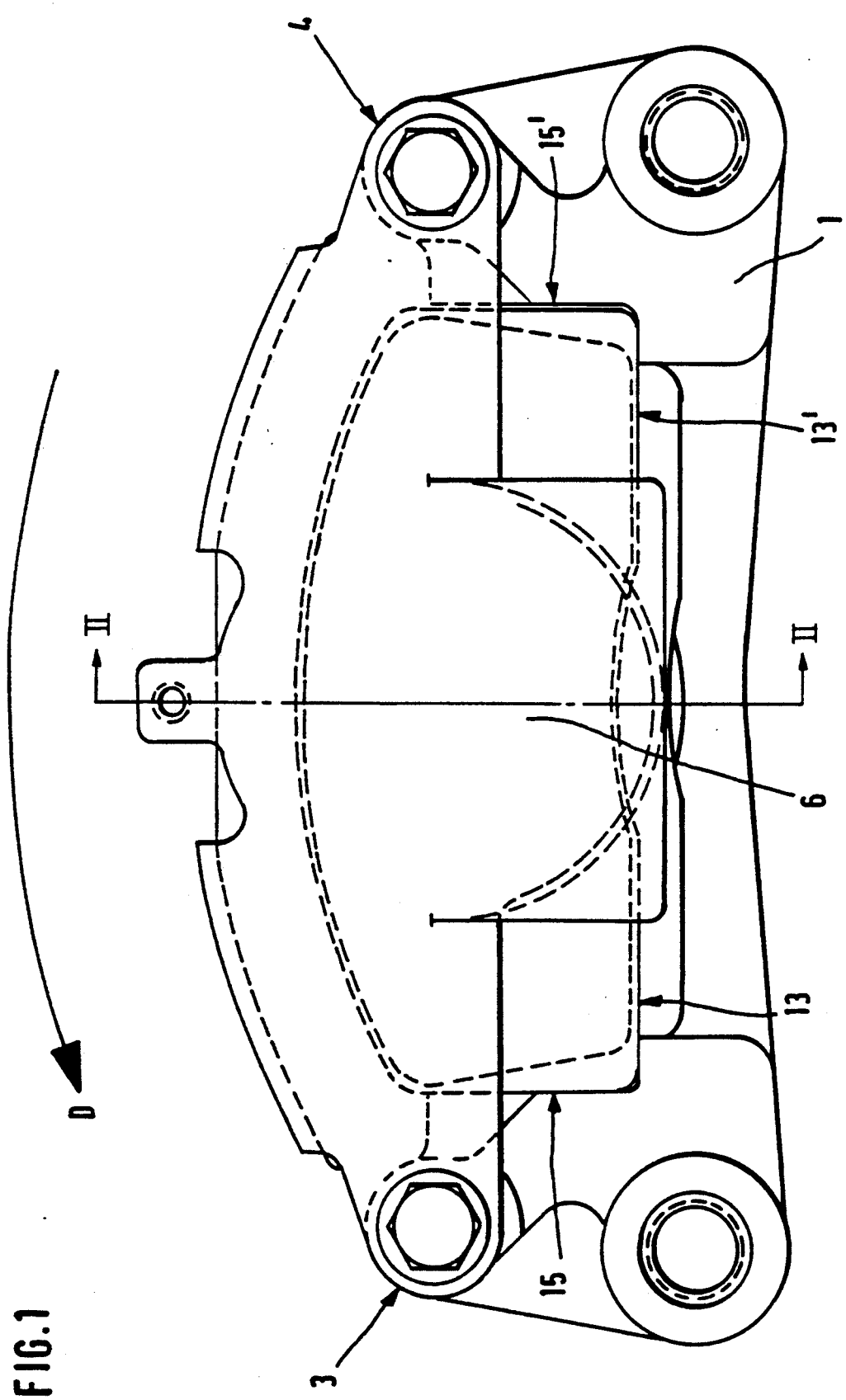
FIG. 1 is a front elevational view of a disc brake.
Figure 2:
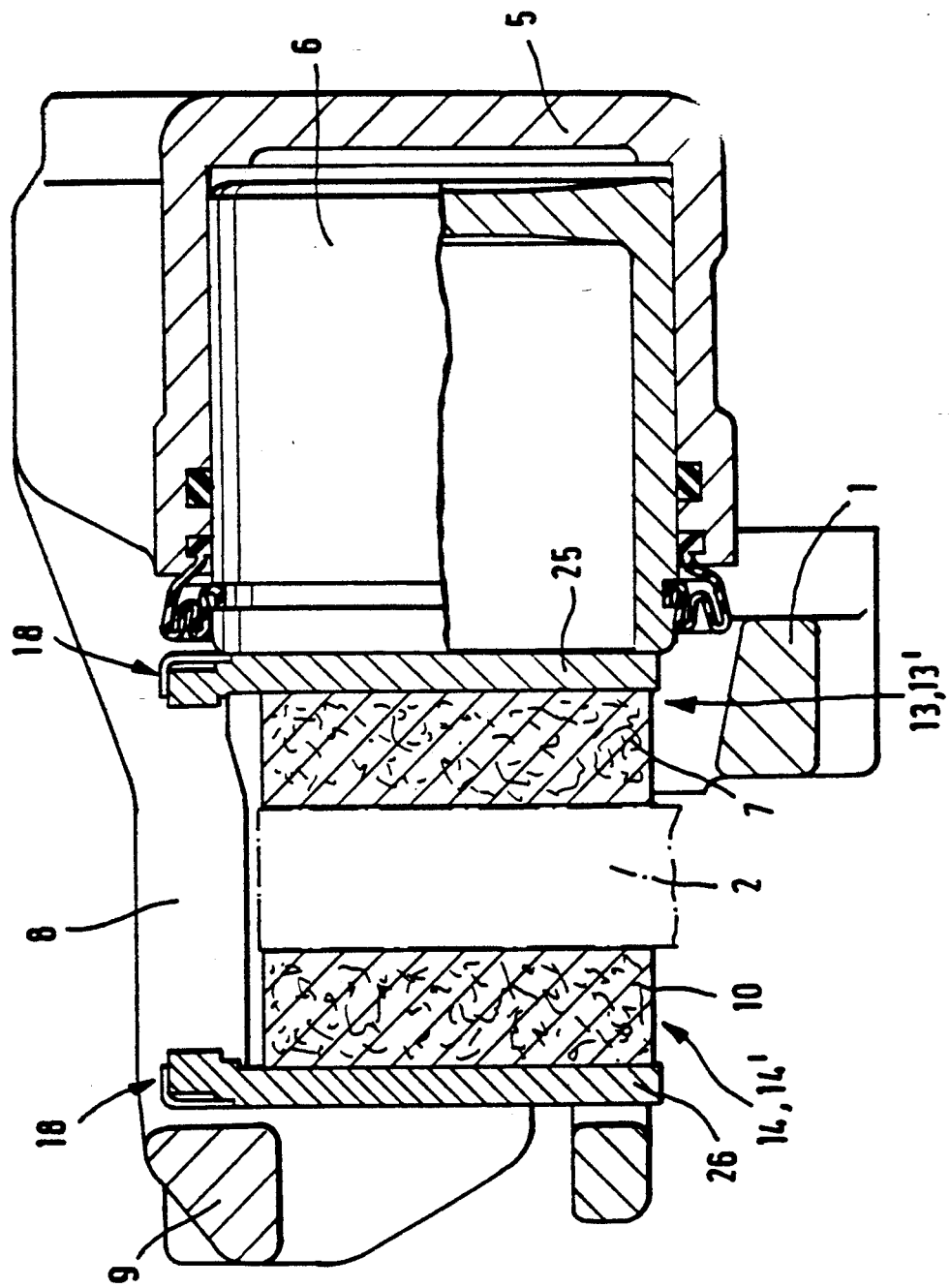
FIG. 2 is a cross-sectional view taken along line II—II of FIG. 1 at a angle to the brake disc.
Figure 3:
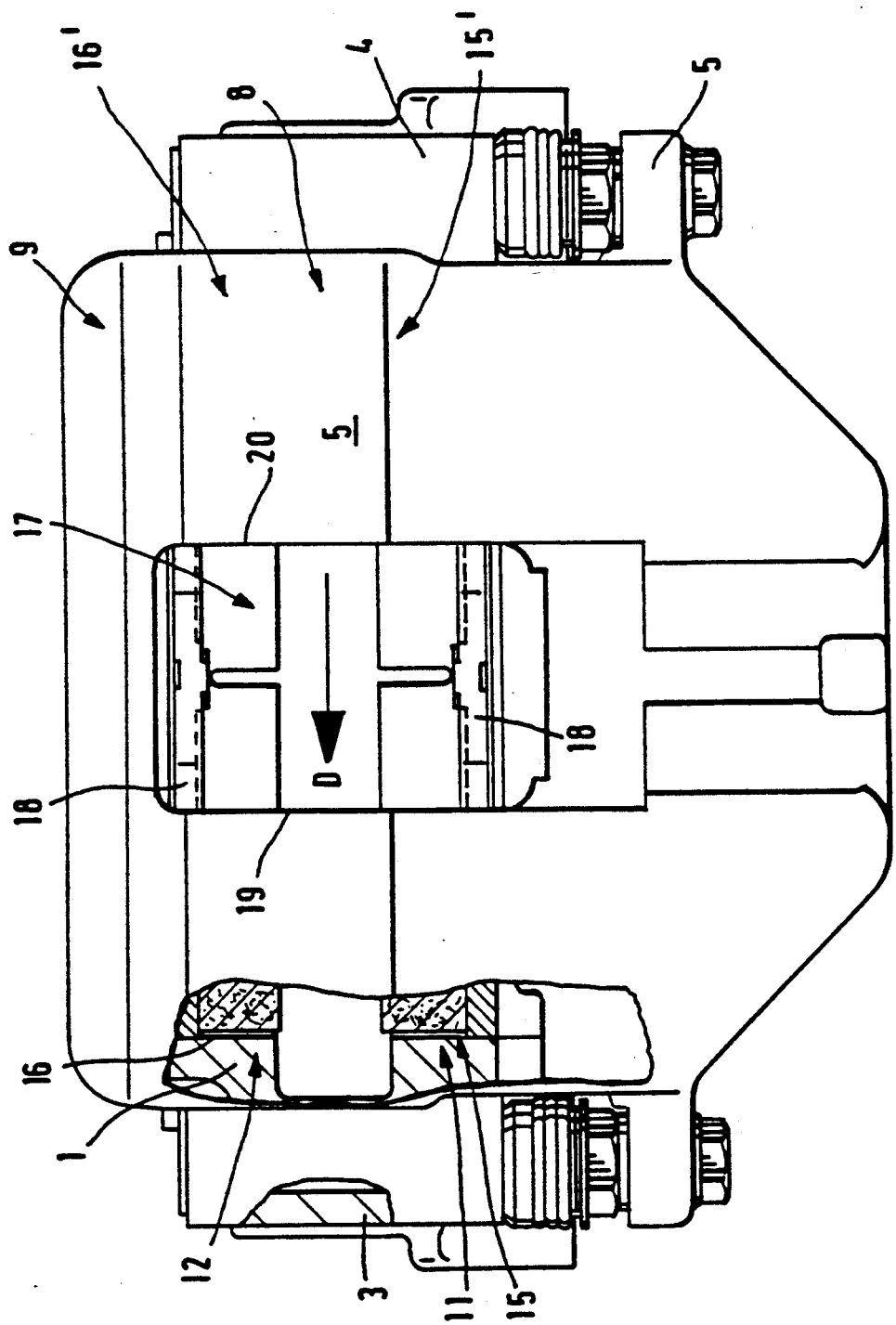
FIG. 3 is a top plan view of the disc brake of FIG. 1.

As is particularly clear from FIGS. 1 to 3, the sliding-caliper disc brake consists of a brake carrier 1 including two lateral sections 3, 4 extending over the brake disc 2, which sections serve as bolt seats of a caliper unit 5 (fist-type caliper) which also extends over the brake disc 2. The caliper unit 5 includes a brake-operating device 6 through which a brake lining 7 can be brought into direct contact with brake disc 2, an area 8 extending over brake disc 2 and adjacent thereto radially inwardly extending area 9 which, upon actuation of the brake, indirectly causes the brake lining 10, opposite the brake-operating device 6, to abut against the brake disc 2.

The two brake linings 7, 10 including their respective brake-lining carriers 25, 26 are held and guided in guide sections 11, 12 of the brake carrier 1 in radial inner guide surfaces 13, 13', 14, 14' and in the peripheral direction on lateral guide surfaces 15, 15', 16, 16'.

Figure 4:
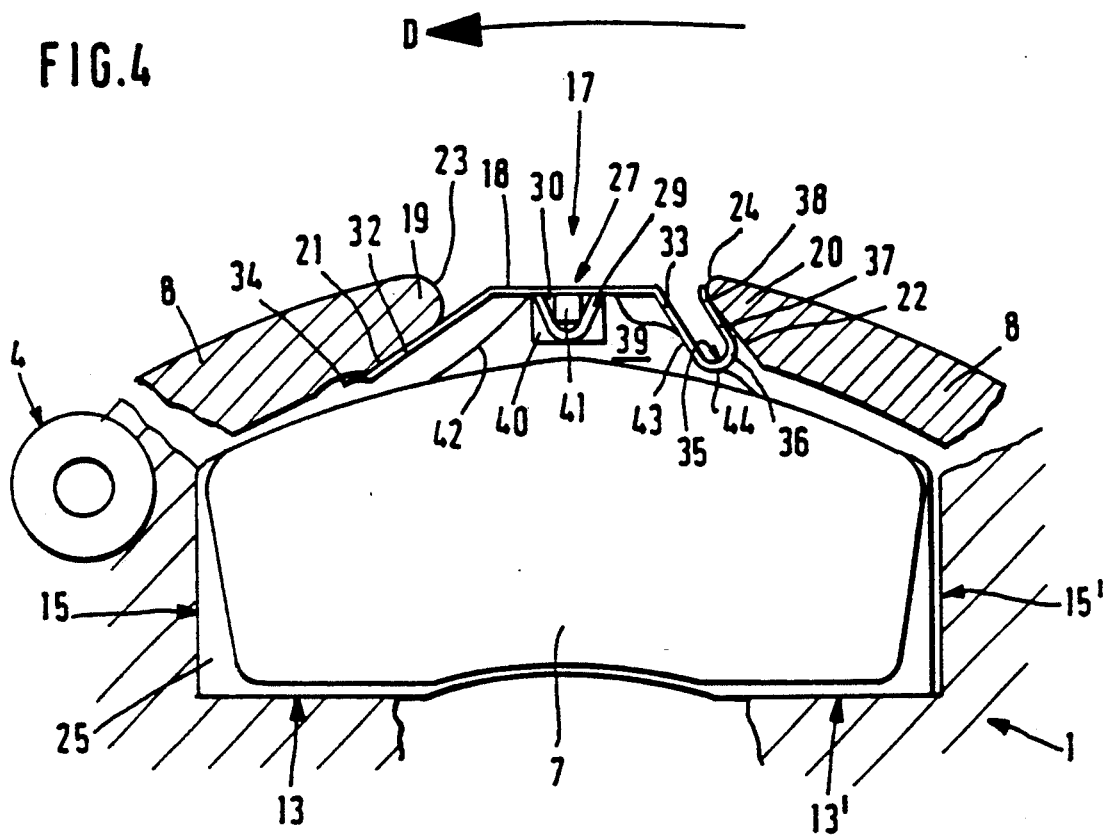
FIG. 4 is a schematic cross-sectional view through the disc brake on a level parallel to the brake disc in the area of the brake-lining carrier.
Figure 5:
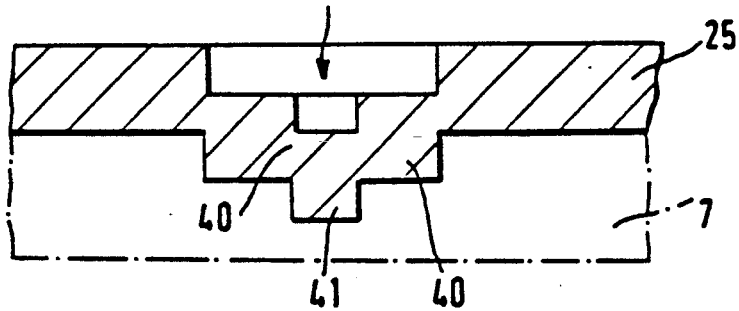
FIG. 5 is a cross-sectional view through a section of the brake-lining carrier, which section serves to fix a holding-down spring.
Figure 6:
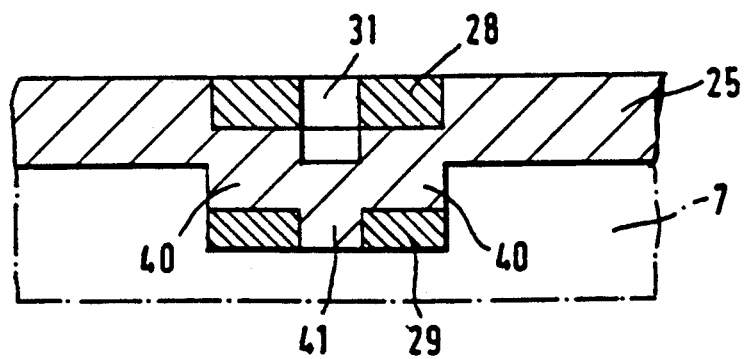
FIG. 6 is a view similar to that in FIG. 5, illustrating the fixing of the holding-down spring.
Figure 7:
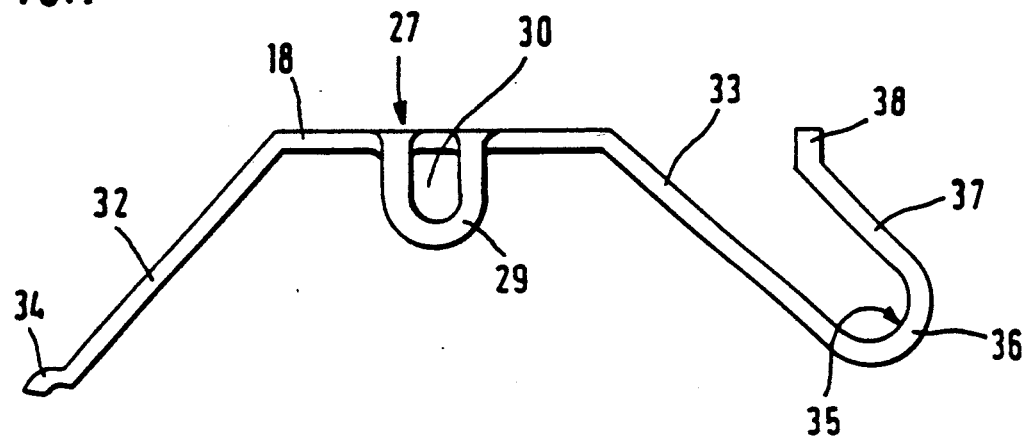
FIG. 7 is a side elevational view of a holding-down spring.
Figure 8:
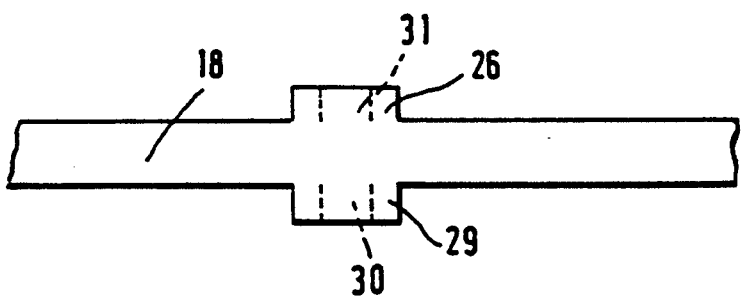
FIG. 8 is a partial top plan view of the holding-down spring of FIG. 7.
Figure 9:
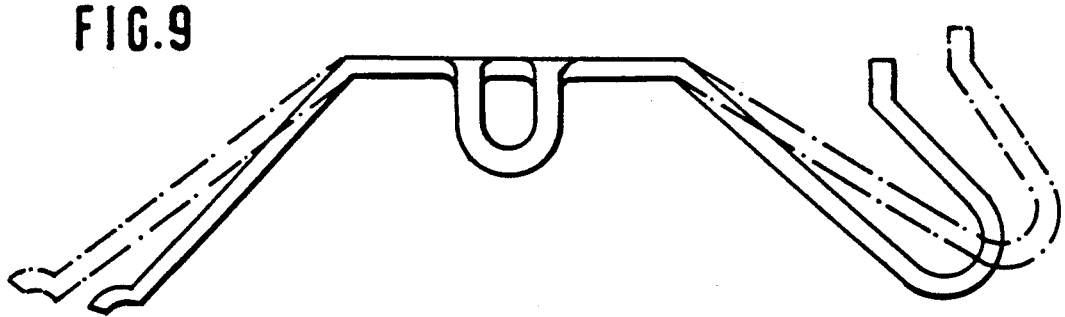
FIG. 9 is a view similar to FIG. 7, wherein the holding-down spring is shown by continuous lines in its fixing position, and by broken lines in its unloaded state.

The area 8 of caliper unit 5, which area extends over the brake disc 2, has an opening 17 which serves for visual inspection of the brake linings, the heat exchange of the brake and the accommodation of a holding-down spring 18 in the form of a leaf spring. As is particularly clearly shown in FIG. 4, the opening 17 of the caliper unit 5 forms a left and a right ledge 19, 20. The cross-section of each ledge 19,20 proceeds transversely towards the inside over the periphery of the brake disc 2 in the direction of the sections 3 and 4 of the brake carrier 1 so that each one left and one right abutment surface 21, 22 for the holding-down spring 18 is formed at the caliper unit 5. Thereby, the transversely terminating abutment surfaces 21, 22 have a radius 23, 24 towards the top side of the caliper unit 5 to form an outer concave portion.

The two brake-lining carriers 25, 26 and the holding-down spring 18, arranged on each of the carriers, are equal in construction, and the breadth of the holding-down spring corresponds with the thickness of the brake-lining carrier.

As shown in FIG.S 4, 7 and 8, the holding-down spring 18, punched from steel sheet, has in its central section, serving as a holding section 27, two angled tongues 28, 29 with complementary openings 30, 31 extending radially downwards. The two tongues 28, 29 are positioned at an angle to each other, allowing safe fixing due to pretensioning of the tongues onto the brake-lining carriers 25, 26.

From the holding section 27 of the holding-down spring 18, two shanks 32, 33 extend on both sides in the tangential direction to the periphery of the brake disc 2, whereby the shank 32 is bent at its end 34 semicircularly and radially inward. However, the other shank 33 has in the area 35 a radially outwardly extending bend radius 36 to form an outer concave portion, whereby a section 37 extending approximately parallel with the shank 33 is formed, which section 37 is at its end 38 angled approximately radially towards the outside with respect to the axis of the brake disc 2 to form an outer concave portion.

The brake-lining carriers 25, 26 each has in its center a radially outwardly extending lining-free section 39 which includes a first shoulder 40 in the form of a release. In this shoulder 40, another release in the form of a second shoulder 41 is centrally placed so that a step-like shape is formed in the section 39. The two shoulders 40, 41 can be manufactured when punching the brake-lining carriers 25, 26 so that a two-stage recess is created on its side positioned away from the brake lining, which recess is complementary to the first and second steps 40 and 41.

The lining-free section 39 of each brake-lining carrier 25, 26 terminates on its side facing towards the shank 32 of the holding-down spring 18 at an incline 42 towards its periphery. The side of the lining-free section 39 facing towards the other shank 33 of the holding-down spring 18 is arranged to be an abutment surface and includes an area 43 which is in parallel with the shank 33 to proceed into a concave curved area 44 which corresponds with the bend radius or convexity 36 of the shank or section 35, and which then terminates in an incline against the outer periphery of the brake-lining carriers 25, 26.

The mounting and removal of the holding-down spring 18 onto and from the brake-lining carriers 25, 26 and of the brake can be effected in an extremely simple manner.

To mount the holding-down spring 18, it is applied onto the lining-free section 39 of the brake-lining carrier 25, 26 while slightly pressing the two tongues 28, 29 apart, and pushed over the second shoulder 41 so that the second shoulder 41 engages in the opening 30 of the tongue 29. The inside surface of tongue 29 will then abut against the outside surface of the first shoulder 40, whereas the other tongue 28 lies on the lining-free side of the brake-lining carrier 25, 26 in the recess which is complementary to the first shoulder 40 and abuts against the outside surface of the respective brake-lining carrier. The abutting arrangement is, as will be explained later, of great significance. Furthermore, the locally fixed holder arrangement between the holding-down spring 18 and the brake-lining carriers 25, 26 ensures that the holding-down spring cannot release itself from its mounting position or during necessary mounting or removal work.

However, as regards the holding-down spring 18 coordinated with the opposite brake-lining carrier 26 the second shoulder 41 engages the opening 31 of the tongue 28.

Thereafter, the two brake-lining carriers 25, 26 including the thereupon mounted holding-down spring 18 are inserted into the guide sections 11, 12 of the brake carrier 1, whereby the shoulders 40, 41 of the brake-lining carrier 25, 26 are necessary so that, during mounting and removal, or during a required exchange of the holding-down spring or the brake lining, the caliper unit 5 can be swivelled in or out of the brake carrier around the rotational point of a bolt seat without the piston of the brake-operating device 6 making contact with the holding device. This consideration also applies to the inside surface of the area 9 of the caliper unit 5, which surface is facing towards the brake disc 2.

When the caliper unit 5 is mounted on the brake carrier 1 via the sections 3, 4, then the shank 32 of the holding-down spring 18 abuts with its shank end 34 against the left abutment surface 21 of the caliper unit 5, while the other shank 33 abuts with its bent area 35 against the complementarily formed areas 43, 44 of the lining-free sections 39 of the brake-lining carrier 25, 26, and with its concave curved shank end 38 against the radius or convex portion 24 of the right abutment surface 22.

When such a disc brake is mounted, the shanks 32 of the two holding-down springs 18 always point in a preferred braking direction towards the exit side of the brake disc.

The holding-down spring 18 operates as follows:

Taking into consideration the preferred braking direction D (see FIG. 4) and the thus resulting mounting position of the holding-down spring 18 on each brake-lining carrier 25, 26, the shank 32 abuts with its end 34 radially against the abutment surface 21 of the caliper unit 5. The outwardly bent section 37 and end 38 of the other shank 33 abut against the abutment surface 22 and the radius 24 both radially and tangentially. This pretensioning of the holding-down spring 18 results in the brake-lining carriers 25, 26 being forced both radially against the guide surfaces 13, 13', 14, 14' and in the braking direction tangentially against the lateral guide surfaces 15, 16 of the brake carrier 1.

This results in the advantage that no knocking sounds occur in the inoperative state, and that due to the surface abutment the earlier mentioned knocking sounds do not develop during the braking either.

If the brake is actuated in opposition to the preferred braking direction, then the brake-lining carrier 25, 26 is displaced against the pretensioning force of the sections 33 and 37 of the holding-down spring 18 against the lateral guide surfaces 15', 16'. With release of the brake, the sections 33, 37 of the holding-down spring 18 push each brake-lining carrier 25, 26 back into its basic position.

We claim:

1. Leaf spring for holding down brake-lining carriers on opposite sides of a disc of a caliper disc brake, said disc brake having an entrance side and an exit side relative to the direction of travel of the disc, wherein each brake lining carrier has a friction-lining thereon and a friction-lining-free section extending radially outwardly, two support surfaces are arranged on radially inner surfaces on both sides of and defining an opening of a caliper unit, the friction-lining-free section of the brake-lining carrier being accommodated in the opening, the leaf spring comprising:
   a holding section;
   first and second uneven shanks extending substantially oppositely to each other and transversely at an angle from said holding section towards the brake-lining carrier;
   said first shank extending in a direction towards the entrance side of the disc brake and having a portion bent away from the brake-lining carrier radially outwardly and an end portion engaging against a portion of one of said two support surfaces;
   said second shank having a portion thereon engaging against at least a portion of the other of said two support surfaces;
   a first protruding shoulder on said friction-lining-free section on the side of said brake-lining carrier facing toward the friction-lining;
   a recess in said brake-lining carrier on the side thereof facing away from said friction-lining;
   two sides on said holding section;
   an angled tongue on each of said two sides of said holding section, said tongues being identical;
   an opening in at least one of said tongues engageable with said first protruding shoulder;
   the other of said tongues being abuttingly engageable in said recess;
   a second protruding shoulder on said friction-lining-free section, said first shoulder protruding from said second shoulder; and
   said at least one of said tongues having said opening therein abuttingly engageable against said second shoulder.

2. Leaf spring as claimed in claim 1 wherein:
said one of said two support surfaces comprises a convex curved outer portion adjacent the opening in the caliper unit; and
said bent portion of said first shank comprises an outer concave end abutting against said convex curved outer portion of said one of said two support surfaces.

3. Leaf spring as claimed in claim 2 wherein:
said friction-lining free section of said brake lining carrier has a concave curved section; and
said bent portion of said first shank comprises a convex curved section abutting against said concave curved section of said friction-lining free section.

4. Leaf spring as claimed in claim 1 wherein:
said friction-lining free section of said brake lining carrier has a concave curved section; and
said bent portion of said first shank comprises a convex curved section abutting against said concave curved section of said friction-lining-free section.

* * * * *